United States Patent [19]

Kausz et al.

[11] 4,043,865

[45] Aug. 23, 1977

[54] PRESSURIZED-WATER REACTOR COOLANT TREATMENT SYSTEM

[75] Inventors: Ivan Kausz, Weiher; Helmut Stünkel; Harald Wille, both of Erlangen, all of Germany

[73] Assignee: Siemens Aktiengesellschaft, Munich, Germany

[21] Appl. No.: 450,346

[22] Filed: Mar. 12, 1974

[30] Foreign Application Priority Data

Mar. 12, 1973 Germany .............................. 2312228

[51] Int. Cl.² ............................................... G21C 9/00
[52] U.S. Cl. ..................................... 176/37; 176/86 L
[58] Field of Search ........................ 176/86 L, 37, 38; 202/197, 198, 202; 203/74, 81

[56] References Cited

U.S. PATENT DOCUMENTS

| | | | |
|---|---|---|---|
| 3,378,450 | 4/1968 | Gramer et al. ..................... | 176/86 L |
| 3,442,766 | 5/1969 | Smith et al. ........................ | 202/197 |
| 3,480,515 | 11/1969 | Goeldner ........................... | 176/86 L |

FOREIGN PATENT DOCUMENTS 1,100,767 · 1/1968 United Kingdom ............... 176/86 L

OTHER PUBLICATIONS

Westinghouse Eng. (USA), vol. 31, No. 5 (Sept. 1971) 130–134 "New Pwr Nuclear Power Plant Systems Reduce Radioactive Releases."
Chemical Engineers' Handbook, Perry ed., pp. 22–101, 4th Ed., McGraw-Hill Book Co.

Primary Examiner—Stephen C. Bentley
Assistant Examiner—Ralph Palo
Attorney, Agent, or Firm—Kenyon & Kenyon, Reilly, Carr & Chapin

[57] ABSTRACT

A pressurized-water reactor coolant treatment system continuously removes a portion of the coolant circulating in the main coolant loop and passes it through a gas separator and a rectification column, among other equipment, and returns the coolant to the main coolant loop. By passing the removed coolant first through the rectification column and thereafter through the gas separator and providing means for controllably shutting off the separator and bypassing the removed flow around the gas separator for passage of the flow from the rectification column back to the loop, it is possible to subject the coolant to both rectification and degassing when the coolant requires such treatment, and when the coolant does not require degassing to shut down the gas separator and put it out of operation. Other features are included.

5 Claims, 1 Drawing Figure

U.S. Patent   Aug. 23, 1977   4,043,865
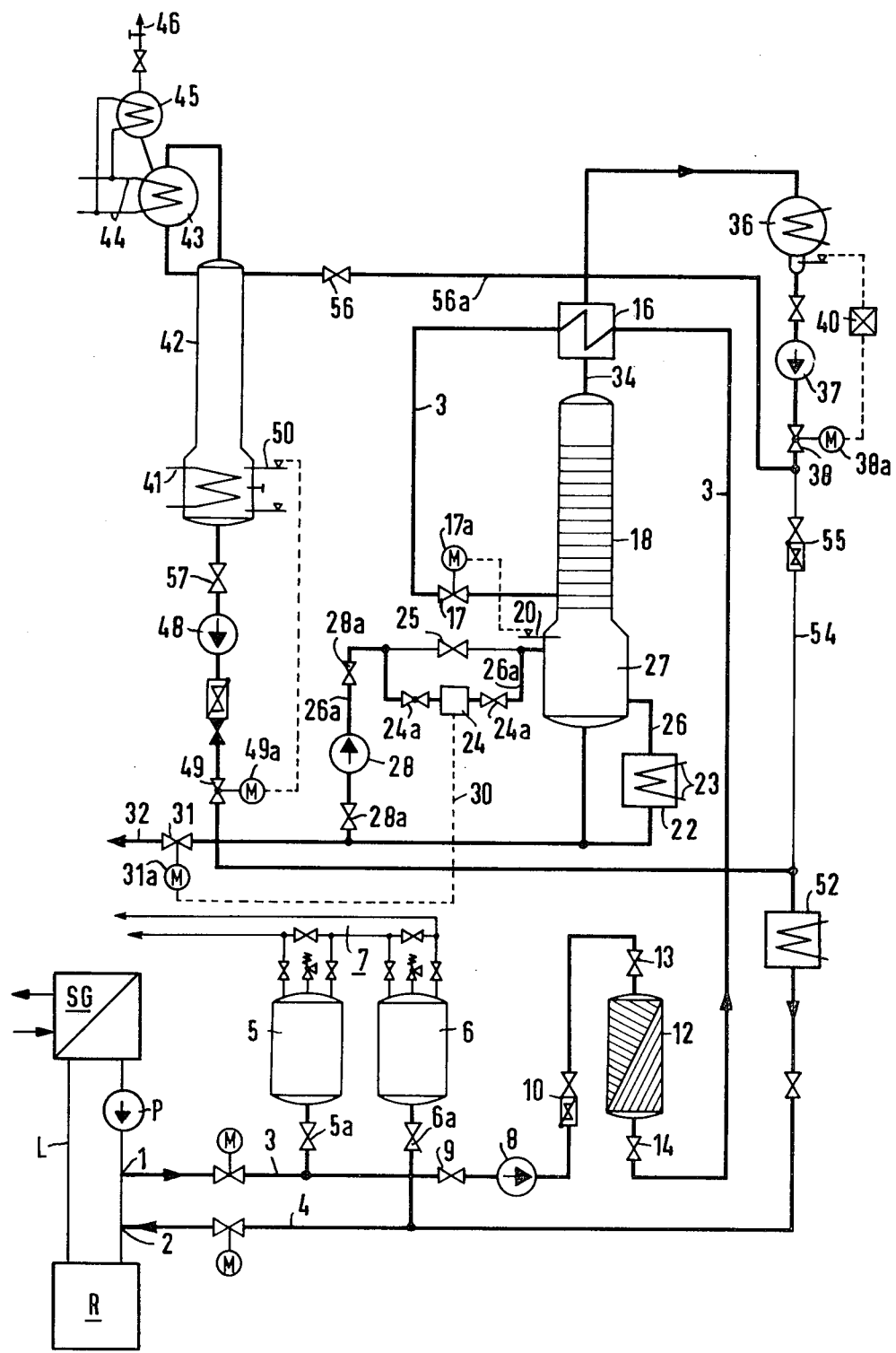

PRESSURIZED-WATER REACTOR COOLANT TREATMENT SYSTEM

BACKGROUND OF THE INVENTION

A pressurized-water reactor connects with one or more steam generators via a main coolant loop through which pressurized-water coolant is circulated by a main coolant pump. A flow of coolant is removed from the coolant circulating in the loop, passed through a treatment system and returned to the coolant circulating in the loop. To avoid the need for extensive adjustment of control rods in the reactor's core, the coolant is provided with a controlled boron content, in the form of boric acid. To hold the coolant's boron content at the desired concentration, the treatment system includes a recification column through which the removed flow is passed and where by fractional distillation or rectification, the boric acid is removed from the removed coolant flow as required. Thereafter, if required, the substantially boron-free coolant may have boric acid added to it to provide the desired boron content required to adjust the activity of the core, this practice usually being called chemical trimming of the core. The boron concentration required for chemical trimming is relatively low.

During the reactor operation, the coolant becomes gassed, and another function of the coolant treatment system is to degassify the coolant, the system, therefore, including a gas separator or degassification apparatus. Other equipment may be included by the system.

Heretofore the system has been organized so that the coolant flow removed from the circulating coolant in the loop, is passed through the gas separator first, for degassification, and then through the rectification column where substantially all of the boron, in the form of boric acid, is removed from the flow, the boron content required for the chemical trimming then being added to the flow under treatment and the flow returned to the coolant circulating in the loop. The flow passed through the treatment system is small in relation to the flow of the coolant circulating in the loop, but the treatment system can be operated continuously to maintain the coolant in the loop in the desired condition. The gas separator requires heating of the coolant and cooling of the separator's reflux condenser and cooling of the separated gas prior to its disposal such as via the reactor plant gas disposal stack, after interposed gas treated, if required, for atmospheric pollution control. Therefore, the operation of the separator involves the expense of the steam and cooling water, and occasionally it may be necessary to service the gas separator requiring it to be shut down, in which event the entire treatment system is put out of operation during the servicing period.

It follows from the foregoing that the operation of the treatment system involves the problems imposed by the possibility of a complete shut-down of the entire system and of the expense of the operation of the gas separator component, as well as the need for precision equipment for metering into the rectified flow the boric acid required to maintain the desired boron concentration for the chemical trimming of the reactor core, in the main body of coolant circulating in the loop.

SUMMARY OF THE INVENTION

In the coolant treatment system of the present invention, in the flow direction of the coolant removed from the loop for treatment, the rectification column is arranged first in line with the gas separator behind this column. Suitable piping provides a means for removing the flow of coolant from the loop and passing the flow first through the rectification column and thereafter through the separator, the flow from the separator being returned to the loop. The piping system is arranged and valved to provide a means for controllably shutting off the separator and bypassing the flow around the separator from the column and returning the flow from the column back to the loop. In other words, the separator can be shut down and put completely out of operation, while the rectification column continues to operate continuously to remove boric acid from the removed flow of coolant which is thereafter returned to the loop.

In explanation of the above, it has been found that during relatively long periods of reactor operation, the circulating coolant in the main loop does not require degassification. This has made it practical to operate the coolant treatment system without degassification of the coolant under treatment. During these prolonged periods, the degasser can be put out of operation or shut down, permitting a substantial saving in energy and while permitting the rectification column to operate continuously.

The rectification column has a heated sump or still in which a high boron condensate or fraction collects, the column delivering from its top a fraction of low boron content for ultimate delivery in condensed form as the treated coolant returned to the loop. To adjust the boron content of this treated coolant to the value required for chemically trimming he core, such as in the order of 10 ppm $H_3BO_3$, the boron, or boric acid, content of the condensate collected in the sump of the column is recirculated externally of the column and via metering or measuring devices automatically controlled by the boric acid concentration value of the collection in the sump. In this way a means is provided for automatically maintaining a substantially constant boron concentration in the high-boron containing fraction in the sump and, with the column operated uniformly, in the low-boron containing fraction leaving the column for ultimate return to the loop.

Furthermore, means are provided for automatically controlling the flow of coolant to be treated, to the column, so as to maintain a constant level of the fraction in the sump of the column. With this level at a constant value and having a boron content that is maintained at a constant value, the low-boron containing fraction which is ultimately returned to the loop, has a boron concentration of constant value, this value being, of course, that desired to maintain the boron content of the circulating coolant in the loop, at the value desired for chemical trimming of the reactor core.

BRIEF DESCRIPTION OF THE DRAWING

The accompanying drawing in a single view diagrammatically illustrates the presently preferred mode for carrying out this invention.

DETAILED DESCRIPTION OF THE INVENTION

Referring to that diagram, the pressurized-water reactor R is shown connected to the steam generator SG by the pipeline forming the main coolant loop L having the main coolant pump P maintaining the circulating of pressurized-water coolant from the reactor R through the heat exchanger (not shown) of the steam generator SG and back to the reactor R.

The treatment system of the present invention is connected to the primary loop L at the connection points 1 and 2 to which pipelines 3 and 4 lead. First coolant storage tank 5 can be connected to the line 3 via a valve 5a, the line 4 also being equipped with a coolant storage tank 6 which can be shut off by means of a valve 6a. These storage tanks can be connected to an exhaust gas system (not shown) via a system of pipelines 7 equipped with appropriate valving which need not be described in detail.

An evaporator feed pump 8 under the control of valves 9 and 10, sends the removed coolant through an ion exchanger 12, also provided with shut-off valves 13 and 14. Incidentally, it is generally good practice to provide shut-off valving around equipment so that when necessary the equipment can be removed from its pipeline for servicing or replacement. Impurities are precipitated by the ion exchanger 12 which, although not shown, may be provided with a mechanical filter for filtering the removed coolant.

Behind the ion exchanger 12, the line 3 leads to a preheater 16 and from there, via a setting valve 17, to the rectification column 18. This column has the sump 27, and although not shown, this sump is provided with heating means so that it functions as a still to produce the vapor which goes up through the column 18. This setting valve 17 is provided with an operating motor 17a controlled by contacts 20 which close when the collection in the sump 27 falls below a predetermined level, the motor then opening the valve until the collection returns to this level, the motor then closing the valve. Liquid level operated electric switches are well known; therefore, the details of 20 are not illustrated.

The collection, of high boron content, in the sump 27 is withdrawn by a pipe 26 through an evaporator 22 containing a heat exchanger heated by steam from a steam supply line 23, its boron concentration being thus increased. The pipeline 26 connects with the sump 27 at a fixed level below the level in the sump 27 kept constant by the level actuated switch 20. These two levels represent constant values.

The pipeline 26 forms a loop 26a back to the sump 27, the end of the pipeline loop 26a connecting with this sump at a fixed level above the level of the connection of the pipeline 26 with the sump. Recirculation is established in the lines 26 and 26a by the pump 28 which is also provided with shut-off valves 28a. Between the pump 28 and the sump 27 a boric-acid concentration measuring device 24 is inserted in the loop, this also being provided with shut-off valves 24a for the general purpose previously referred to. This measuring device 24 can be of a prior art type measuring the boric-acid concentration by measuring the specific gravity of the recirculating high-boron containing fraction, of which the boric-acid concentration is an analog. Such measuring devices can be obtained as containing an electric switch and this type of device is used here, its output signal going to a valve 31 operated by a motor 31a under the control of the switch arrangement of the device 24. The valve 25 is provided to shunt the recirculating flow around the measuring device 24 when desired.

In operation, with one or the other of the valves 28a closed, the high boron containing fraction in the sump 27 is discharged via the pipeline 26, with its boron concentration increased by the evaporator 22 and via the valve 31, which is open, to the output 32 for storage. With the valve 31 operated by its motor 31a and under control of the measuring device 24, valves 24a and 28a being opened, and valve 25 being closed, the measuring device 25 activated by the boric acid content of the recirculating coolant opens and controls the valve 31 so it opens and closes as required to send more or less of the high-boron containing fraction from the sump 27, increased in its boron concentration by the evaporator 22, back to the sump 27, thus maintaining the boric-acid or boron concentration of the collection in the sump 27 at a constant value. With the boric-acid content held at a constant and known value in the sump or still 27, the low-boron containing fraction, having a known low-boron content, is ultimately returned to the loop L.

It has briefly been mentioned that the boron content required for trimming the reactor core is in the area of 10 ppm $H_3BO_3$. The high-boron containing fraction sent back to the sump 27 under the control of the boric-acid content measuring device 24, may be in the area of 4% $H_3BO_3$ in which the case the measuring device 24 is set to effect the recirculation as required to maintain this value, this, of course, also being the value maintained as a constant value, in the collection of the high-boron containing fraction maintained in the sump 27 for distillation upwardly through the column 18.

The coolant of adjusted-low boron content leaves the column 18 at its top via a pipeline 34, going first to the preheater 16 for the coolant introduced to the column via the line 3, and from there through the rectification or distillation column's condenser 36, the flow being under the force of the pump 37. The level of condensate in the condenser 36 is shown as being controlled by a measuring transducer 40 which operates the valve 38 via a motor 38a. By controlling the discharge of the condensed flow-boron containing coolant from the condenser 36, the condensate level in the latter is controlled.

The gas separator or stripper or degassifier is shown at 42 as connecting with the outlet end of the valve 38 by a pipeline 56a controlled by a valve 56. The liquid output of the gas separator 42 can be closed off by the valve 57, so that with the valves 56 and 57 closed, the gas separator 42 is entirely shut off from the other equipment, although the described operation of the rectification column 18 and its associated parts may continue in operation. The gas separator 42 is heated by a steam coil 41 and its output of separated gas goes through a reflux condenser 43 provided with a water cooling coil supplied via cold water pipelines 44. From the reflux condenser 43 the gases give off going through a gas cooler 45 to an exhaust gas system via a connection 46, being suitably treated to prevent it from being a pollution problem.

When the degassification of the coolant is required, the valves 56 and 57 are opened. A pipeline 54 carries the coolant rectified by the column 18 back to the connection point 2 via a heat exchanger 52 which cools the coolant, the latter either being stored in the storage tank 6 or returned directly to the coolant loop at the connection point 2.

Remembering that the valves 56 and 57 have been opened to put the gas separator 42 into service, valve 55 in the pipeline 54 is closed, this sending the boron-content adjusted coolant via the line 56a to the gas separator 42, the liquid coolant freed from gas flowing through the valve 57 under the force of the pump 48 and to the line 54 for passage through the cooler 52.

Thus, when degassification is required, the system operates with the rectification column 18 and the gas separator 42 behind this column, working in series to deliver properly treated coolant, having the proper boron content, to either the tank 6 or back to the coolant loop L.

As shown, the liquid level in the heated sump of the gas separator 42 may be adjusted by a liquid level actuated switch 50 which controls a motor 49a operating a valve 49 between the pump 48 and the pipeline returning the fully treated coolant to the cooler 52.

What is claimed is:

1. A pressurized-water reactor having a main coolant loop containing circulating pressurized-water coolant containing boron, and a coolant treating system comprising a gas stripper and a rectification column and means for removing a flow of said coolant from said loop and passing said flow through said stripper and column and back to said loop; wherein the improvement comprises said means being for passing said flow first through said column and thereafter through said stripper said system includer means for controllably shutting off said stripper and bypassing said flow around said stripper for passage of said flow from said column back to said loop.

2. The reactor of claim 1 in which said column separates a high-boron containing fraction from said flow and has a sump in which said fraction collects.

3. The reactor of claim 2 in which said system includes means for automatically maintaining a substantially constant boron concentration in said fraction in said sump.

4. The reactor of claim 2 having means for controlling said flow to said column, automatically in response to the level of said fraction collected in said sump.

5. The reactor of claim 3 in which said means for maintaining said concentration is formed by means for recirculating said high-boron containing fraction in said sump at a rate automatically responsive to the boron concentration of said fraction collected in said sump.

* * * * *